Jan. 9, 1951 E. L. ARNESON 2,537,615
BOTTLE CARRIER
Filed Jan. 11, 1949 6 Sheets-Sheet 1

INVENTOR.
Edwin L. Arneson
BY
Cromwell, Greist & Warden
Attys

Jan. 9, 1951    E. L. ARNESON    2,537,615
BOTTLE CARRIER
Filed Jan. 11, 1949    6 Sheets-Sheet 2

INVENTOR.
Edwin L. Arneson,
BY
Cromwell, Greist + Warden
Attys

Jan. 9, 1951     E. L. ARNESON     2,537,615
BOTTLE CARRIER Filed Jan. 11, 1949     6 Sheets-Sheet 3

INVENTOR.
Edwin L. Arneson,
BY
Cromwell, Greist & Warden
Attys

Jan. 9, 1951 E. L. ARNESON 2,537,615
BOTTLE CARRIER
Filed Jan. 11, 1949 6 Sheets-Sheet 5

INVENTOR.
Edwin L. Arneson,
BY
Cromwell, Greist & Warden
Attys.

Patented Jan. 9, 1951

2,537,615

UNITED STATES PATENT OFFICE 2,537,615

BOTTLE CARRIER

Edwin L. Arneson, Morris, Ill., assignor to Morris Paper Mills, Chicago, Ill., a corporation of Illinois Application January 11, 1949, Serial No. 70,247

8 Claims. (Cl. 229—52)

The present invention pertains to certain improvements in a well-known flexible paperboard bottle holder or carrier for soft drinks and like beverages, and to an improved method for fabricating the same. It is the primary purpose of the invention to provide a bottle carrier of this type, having improved carrying strength and resistance to twisting, weaving and wracking when loaded and subjected to various sorts of stresses, either in being transported by hand or in the relatively rough handling, loading or stacking treatment which it commonly receives.

The bottle holders herein dealt with are of the general type illustrated and described in the patent to Lebold No. 2,389,318, dated November 20, 1945. Such holder is characterized by opposed pairs of vertical, flexible side and end walls, by an integral longitudinal partition and suspending member extending in a vertical plane between and parallel to said end walls, and by flexible cross partition straps which are disposed in longitudinally spaced, vertical planes and are integrally hinged on vertical fold lines to the respective side walls and to the vertical partition and suspending panel. As illustrated and described in the patent referred to, said suspending panel is proportioned in height so that it does not project above the tops of bottles disposed in certain cells defined by said partition panel and cross partition straps, on either side of said panel, whereby loaded carriers may be stacked vertically one on top of another without distortion of the suspending panel. The carrier structure of the present invention also has this feature of advantage.

Recent developments aiming at the improvement of bottle carriers of the sort mentioned above have been mainly directed to the increasing of the rigidity and load carrying strength of the suspending panel. One way of accomplishing this is by the provision of laterally extending flaps in certain component sections of the panel referred to, which flaps are folded inwardly onto the panel sections and adhered thereto. Said sections and conjoined folded flaps are then adhered to one another to provide a substantially thickened, reinforced and rigidified panel construction. Such expedients are satisfactory to the extent that they stiffen and reinforce the central carrier panel by building up the thickness thereof. However, they have little appreciable effect on the carrier, other than in the suspending panel thereof, and the carrier remains objectionably subject to lateral weaving or twisting under bending or wracking stresses which it frequently encounters in use. In short, response of the reinforced panel carrier to such stresses, particularly in the side and end wall areas and at the connections of the latter to the central panel, is much the same as that of the unreinforced carrier.

Moreover, it has been found that the arbitrary addition of thickening plies of material in said panel tends to detract somewhat from the efficiency of operation of the standard type of gluing machines by which the bottle holders are commonly fabricated. The built-up multi-ply area of the panel, being located immediately adjacent other areas of the carrier which, in its flat knocked-down condition, are of substantially lesser thickness than the panel, often results in non-uniformity of adhesion of these thinner parts under the action of the pressure rolls of the gluing machine. The folded blanks progressing rapidly through the machine tend to cause bumping and unevenness of operation of the pressure rollers of the latter.

It is therefore a general object of the invention to provide a simple, flexible paperboard bottle carrier having improved provisions for reinforcing and stiffening the characteristic medial supporting and partition panel thereof, as by building up the sectional thickness of said panel, and for correspondingly strengthening the carrier to resist twisting stress, as by certain details of structure associated with said panel rigidifying provisions, whereby said carrier is given pronounced anti-weaving qualities as regards bending or twisting in both the longitudinal and the lateral direction.

More particularly, an object is to provide a one-piece paperboard bottle carrier characterized by an upstanding, vertical, multi-ply suspending panel, in which said panel is constituted by a pair of like parallel panel sections, plus lateral flaps integral with said sections which are folded and adhered in side-by-side relation therebetween; and in which certain further integral flap elements on the end walls of the carrier are interleaved with and adhered to the plies of said panel, represented by said sections and their flaps, in a manner to distribute the rigidity and twist-resisting strength of said panel to the carrier end walls, and vice versa.

Another object is to provide a bottle carrier of the type referred to above having means to improve the uniformity of thickness of the carrier in the flat knock-down condition thereof, in zones adjoining said panel reinforcing and stiffening means, whereby the carrier is successfully manufactured on existing types of high-speed gluing machinery.

Still another specific object of the invention is to provide an improved paperboard bottle carrier for a plurality of like bottles of uniform girth and height, characterized by a central upstanding partition and suspending panel preferably of height insufficient to extend above the tops of bottles disposed in said carrier, by end walls having integral flap portions on the margins thereof and by panel flap extensions folded on and adhered to a pair of panel sections to constitute said panel, in which said integral end wall flap portions are adhered to and overlap said panel flap extensions in both the horizontal and vertical directions, whereby to perform the multiple functions of contributing to the strength and rigidification of the aforesaid panel by increasing its sectional thickness, of causing the carrier end wall to coact with said panel in a novel manner to resist twist in a lateral as well as a longitudinal sense under bending and wracking stresses, and of contributing to improved efficiency of the manufacture of the carrier on existing machinery by improving its uniformity of thickness at closely adjoining areas.

A still further object is to provide a carrier of the type referred to in the preceding paragraphs, characterized by vertically disposed cross partition straps connecting the respective sections of the vertical suspending and partition panel thereof with the respective, opposed, vertical side walls, in which said partition straps are cut from the material of said respective panel sections and side walls in such manner as to define bottle receiving cells of different side wall height, and, in a preferred embodiment, in which said panel sections are integrally connected to one another at the top of said panel.

A still further object is to provide a side and end-walled bottle carrier of the foregoing sort having certain portions of the end walls thereof in-turned and so secured in longitudinal overlapping relation to the central, panel-defining sections, and/or certain flap extensions thereof, that the vertical load of the filled and suspended carrier is distributed to a substantial degree through the end walls of the carrier, in addition to the mutually coacting relation of said panel components and end walls in resisting weaving stresses in both the longitudinal and lateral directions.

The foregoing statements are indicative in a general way of the nature of the invention, but other and more specific objects will be apparent to those skilled in the art upon a full understanding of the construction and operation of the device.

Various embodiments of the invention are presented herein for purpose of exemplification, but it will be appreciated that the invention is susceptible of incorporation in other modified forms coming equally within the scope of the appended claims.

Figure 1:
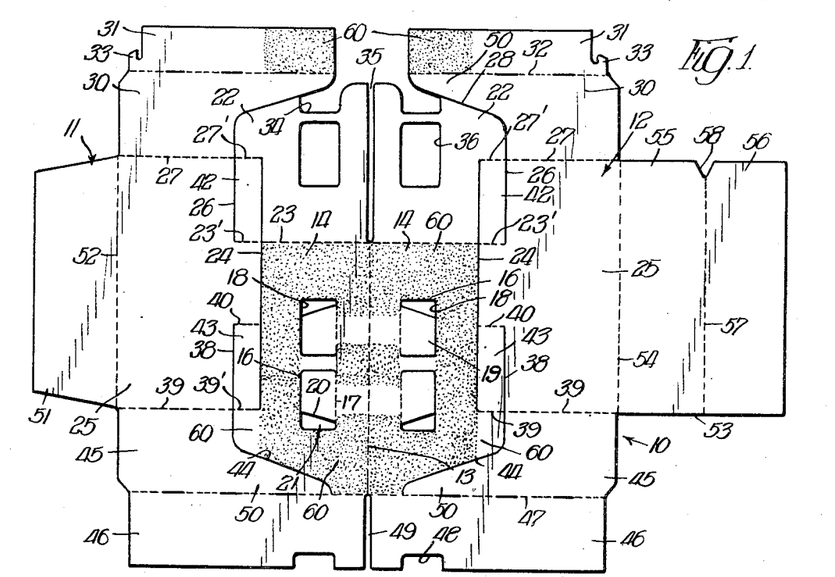
Fig. 1 is a plan view showing a flexible paperboard blank as died out, cut, creased and preliminarily glued for the production of the improved bottle carrier of the present invention, in a preferred embodiment thereof.
Figure 2:
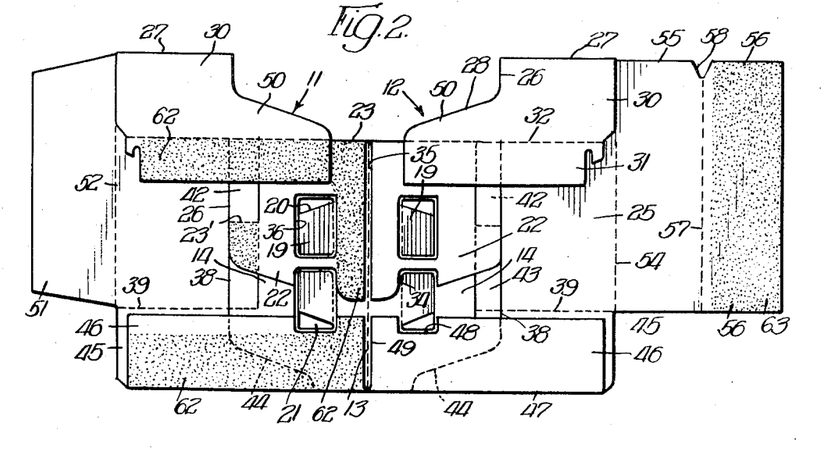
Fig. 2 is a plan view illustrating the blank following certain further folding and gluing manipulations.

Referring now to Figs. 1 to 4 inclusive of the drawings, and in particular to Figs. 1 and 2 thereof, the reference numeral 10 generally designates a flat blank of flexible paperboard stock of a suitable, inexpensive grade. This blank may be of relatively light caliper or thickness, in view of the fact that the improved reinforcing provisions of the invention impart to the carrier pronounced resistance to bending, twisting and tensional stresses.

Blank 10 comprises two opposed sections, generally designated 11, 12, which are of practically identical shape and treatment and are manipulated in practically identical manner in the manufacture of the carrier. Accordingly, description of the features of but one of the sections will suffice, corresponding reference numerals being employed to designate corresponding parts of the other.

Sections 11, 12 are bendably connected to one another by the longitudinal, central crease or fold line 13, which thereby separates the respective sections 14 of the central partition and supporting panel of the carrier. This panel is generally designated in Figs. 3 and 4 by the reference numeral 15. The panel section 14 is provided with a pair of U-shaped slits 16, connected at their ends by creased fold lines 17 to define the finger holes 18 and the bendable tabs 19 which are normally disposed in the plane of the panel section but are deflected therefrom in use. It will be noted that the ends of the tabs 19 are angularly truncated at 20 to define generally triangular openings 21, the purpose of which will be hereinafter referred to.

A foldable flap 22 is conjoined to one end of the panel section 14 by means of a crease line 23 disposed normal to the medial crease 13. The crease 23 extends beyond the lateral limit of the panel section 14, defined by a slit 24 paralleling medial crease 13. This crease extension is designated by the reference numeral 23'. It extends into the rectangular side wall section 25 of the blank, which is separated by slit 24 from panel section 14, and is intersected at its end by an angled slit 26. Slit 26 runs outwardly in a direction paralleling the medial crease 13 and slit 24, intersecting the transverse crease 27 which defines the end margin of side wall section 25, and is then angled sharply at 28 toward crease 13, extending throughout a substantial portion of the transverse dimension of the adjacent panel flap 22. The slit 26 separates the panel flap 22 from the end wall section of the blank, designated 30, which is bendably connected to the side wall section 25 by the fold line 27.

End wall section 30 has a generally rectangular bendable tab 31 of substantial area connected thereto by a series of alternate creases and slits constituting a fold line 32, and said tab 31 is shaped at its outer edge to provide a bottom locking hook 33, for a purpose to be described.

Material is removed from the end of the blank adjacent panel flaps 22, end wall sections 30 and end wall flaps 31 to separate said respective end wall sections and flaps from one another and to define partial finger openings 34 in the panel sections. These last named sections are in turn separated substantially from one another, to accommodate thickness of material and allow for ready folding along the medial crease 13, by an elongated slot 35. This slot is aligned with said medial crease and terminates at the transverse crease 23, coincident with the margin of the panel section 14. The partial openings 34 are of somewhat greater length and lateral width than the finger holes 18 in the panel section 14, as are the further rectangular openings 36 in panel flaps 22, it being understood that the various openings referred to are so positioned that when flaps 22 are folded along fold line 23 onto sections 14, the respective openings will be in superposed register.

An angled slit 38, generally similar in shape and disposition to the slit 26, is provided adjacent the opposite end of the blank. This slit commences in the side wall section 25 at a point about two-thirds of the distance between the transverse, side wall defining crease 27 and a similar transverse, side wall defining crease 39 along the opposite end of side wall section 25. A short transverse crease 40 connects the inner end of slit 38 with the longitudinal slit 24, and the wall defining crease 39 is extended at 39' to intersect slit 38, terminating at the end of the aforesaid longitudinal slit 24. This method of slitting and creasing the blank provides pairs of cross partition straps 42, 43 which are freed from the portions of the blank constituting the central panel and the respective side wall sections thereof, said straps being hingedly connected to the respective panel and wall sections by the foldable creases 23', 27' adjacent one end of said sections, and by the like foldable creases 39', 40 adjacent the other end thereof. The angled slit 38 extends across the marginal side wall defining crease 39 and is then directed sharply toward crease 13, as indicated at 44, to separate the panel section 14 from an end wall section 45, in the same manner that the slit 26 separates said panel section from the opposite end wall section 30.

The mutually convergent angling of the pairs of slits 26, 38 at the portions 28, 44, respectively, provides on each of the end wall sections 30, 45 a generally triangular end wall extension 50 of substantial transverse dimension. These pairs of extensions constitute a vertically elongated, bracing abutment of triangular or pyramidal outline at each end of the carrier when the latter is in the erected condition (see Fig. 4), which not only improves the appearance of the carrier considerably but also functions as a load supporting and twist-resisting element to enhance the strength of the carrier to a substantial degree.

End wall section 45 has a generally rectangular flap 46 hingedly connected thereto by alternate slits and creases constituting the transverse fold line 47, said fold line cutting across the outer end of the angled slit 38, which thus terminates at the end margin of the panel section 14. Said flap 46 is recessed at 48 for register with the panel section opening 18 when the flap is folded inwardly along line 47. A slot 49 in alignment with the medial crease 13 and terminating at transverse crease 47 separates said flaps 46 from one another.

The two opposed sections 11, 12 of the blank differ from one another only in that the former carries a single, bottom reinforcing flap 51 of substantial area hingedly connected thereto by the crease 52, said last named crease defining the bottom margin of one of the side wall panels 25. Carrier section 12 has a full width bottom section 53 foldably connected thereto by the crease 54 which defines the lower margin of the other side wall panel 25. This bottom section is of width approximating that of the set-up bottle carrier and is subdivided into two equal, foldably connected portions 55, 56 by a medial longitudinal crease 57. A triangular detent notch 58 is formed in bottom section 53, at one end of the medial crease 57, for coaction with the locking hooks 33 on end wall flaps 31.

In completing the manufacture of the carrier, a coating 60 of a suitable adhesive is applied to the respective panel sections 14 and to end wall flaps 31 in the general pattern illustrated by stippling in Fig. 1, whereby, when the panel flaps 22 are folded over on hinge lines 23 and the end wall sections 30 (and flaps 31) are folded over on hinge lines 27, to unite said panel flaps 22 with panel sections 14 and said end wall flaps 31 with the respective infolded panel flaps 22. The end wall flaps 46 are simultaneously folded over on line 47 and adhered to the adjacent adhesive bearing areas of the respective panel sections 14, bringing said flaps into overlying but unadhered relation to the end wall sections 45, including the triangular extensions 50 thereof.

The blank is now in the intermediate condition shown in Fig. 2. It is to be noted that the end wall flaps 31 and 46 are not adhered to either the side wall sections 12 or to the partition straps 42, 43.

However, said flaps 31 overlap and are adhesively secured to the infolded panel sections 22

Figure 5:
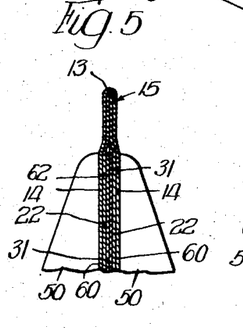
Figs. 5 and 6 are, respectively, enlarged views in vertical section along lines 5—5 and 6—6 of Figs. 3 and 4, illustrating more clearly the make-up of the multi-ply, medial partition and suspending panel of the carrier.
Figure 6:
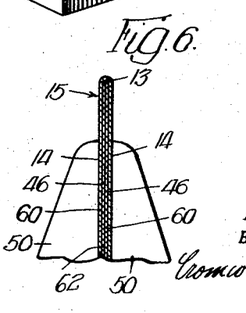
Figure 7:
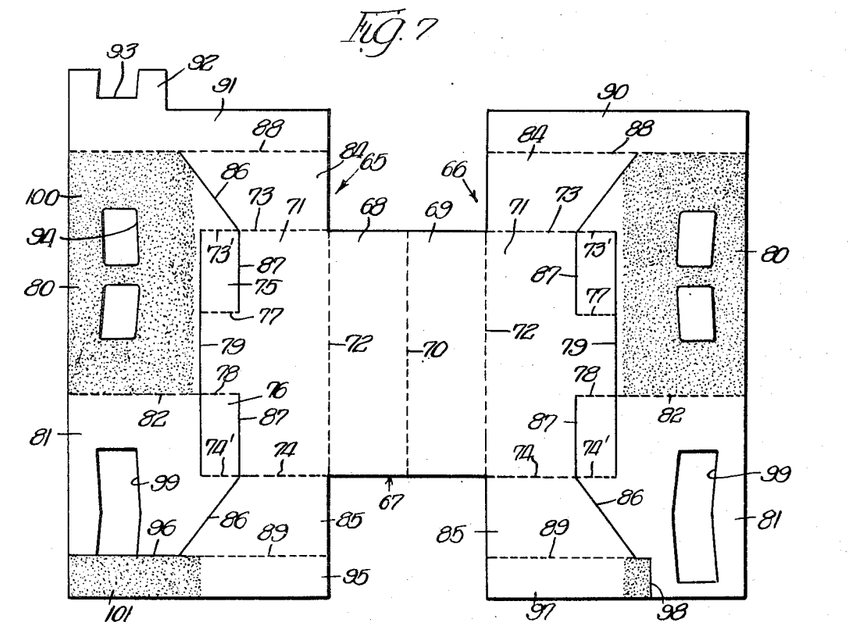
Fig. 7 is a plan view of a died out, cut, creased and preliminarily glued blank employed in the manufacture of a bottle carrier according to a somewhat modified embodiment of the invention.

(which are in turn adhered to panel sections 14), over an area of considerable longitudinal and lateral extent, immediately adjacent the panel flap fold line 23 and end wall flap fold line 32 aligned therewith. The relationship of plies is illustrated in Fig. 5. Likewise the opposite end wall flaps 46 are strongly adhered to panel sections 14 over a substantial area, as shown in Figs. 2 and 6.

Adhesive 62 is now applied to the upper surface of certain of the respective infolded flaps 31, 46 and 22 of the folded blank, as indicated by stippling in Fig. 2. Adhesive is also applied to the lateral glue flap 51 on carrier section 11, as indicated at 63. The carrier section 11 is then folded about medial crease 13 upon the section 12 and bottom section 56 is folded about crease 57 onto flap 51 and adhered thereto to complete the manufacture of the carrier. It is shown in Fig. 3 in its flat, knock down condition.

In erecting the carton, it is only necessary to apply compressive force to the opposite end margins 27, 47 of the flat article, after initiating a slight spreading of the side wall sections 25. This compression spreads the respective opposed walls and brings the carrier to generally rectangular set-up outline. In order to hold the carrier in said shape, so as to facilitate loading by an automatic loading machine, for example, the bottom section 53 is next urged upwardly past a flat horizontal plane through its medial crease 57 and the detent notch 58 at one end of said crease is then engaged in locking relation with the hooks 33 on the in-turned, adhesively secured end wall flaps 31. This interlock of the bottom and end flaps may possibly be disengaged by the impact of the bottles during the loading operation, but this is not objectionable inasmuch as the bottles themselves thereafter serve to hold the carrier in desired shape.

Figures 3, 4:
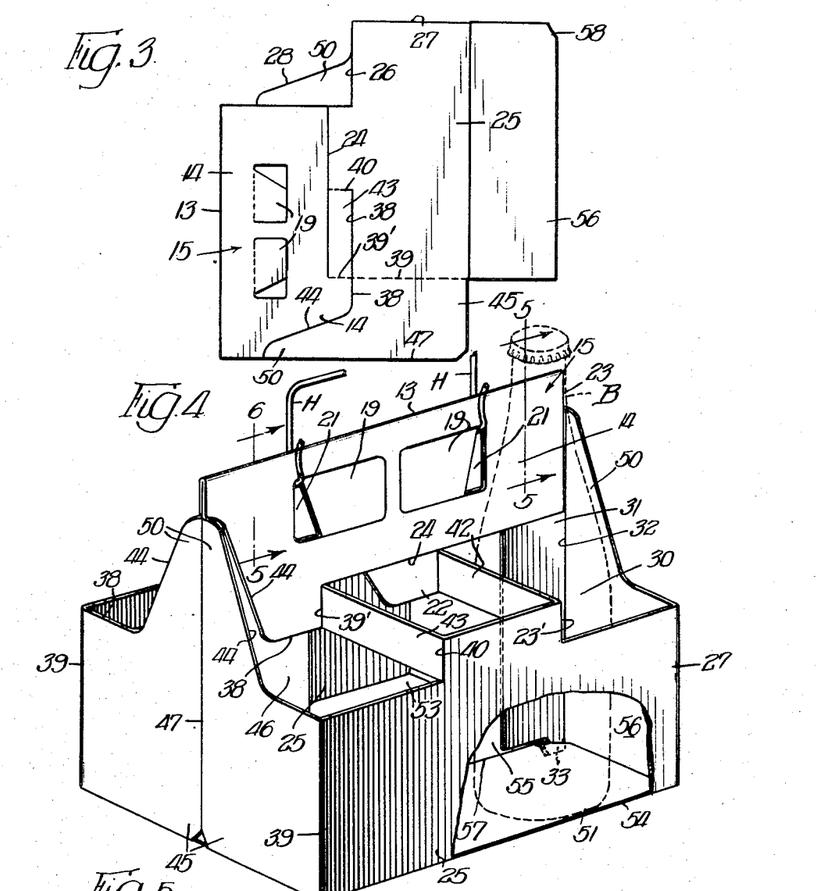
Fig. 3 is a plan view of the carrier in its final, completed condition, in a flat, knocked-down position for shipment or storage.
Fig. 4 is a perspective view showing the bottle carrier in its erected operative position with bottles, indicated in broken line, in the cells thereof.

The erected carrier is illustrated in Fig. 4, being shown loaded with bottles B which are indicated in broken line. It will be noted that panel 15 terminates below the tops of said bottles so as not to interfere with vertical stacking of the loaded carriers, one on top of the other. Various advantages of this relationship of parts are described in considerable detail in the patent to Lebold identified above, hence need not be further discussed. The carrier may be suspended directly by the fingers, after deflecting the tabs 19 out of the plane of panel 15, or, alternatively, a separate wire handle H may be employed for this purpose. The triangular openings 21 facilitate application of such handle and the tabs 19 serve to restrain it laterally. When not in use the handle H may be depressed below the bottle tops to permit vertical stacking of loaded carriers.

The multi-ply construction of panel 15, illustrated in Figs. 5 and 6, affords substantial rigidification and strengthening thereof to resist tearing stresses. When gripped directly in the fist, this built up panel structure affords a feeling of stability and solidity. It also affords a non-crumpling, non-tearing zone of substantial body to engage the supporting hooks of the wire handle H, when employed. Furthermore, the adhered plies of said panel 15 are concealed and protected at the top of the latter by the integral connection of sections 14 along medial crease 13. The top margin of said panel is not exposed to disfiguring scuffing and dislodgement of the plies.

A notable feature of the carrier is the novel interaction of the multiple handle reinforcing plies, constituted by sections 14 and flaps 22, 31 and 46. By reason of the interleaving and adhering of the wall connected flaps 31, 46 within the plies of the built up panel 15, the strength of the latter is in part transferred to the carrier end walls. This transfer is effected through the vertical triangular abutments which are constituted by the integral extensions 50 of end wall sections 30 and 45. The panel 15, ranging from four to six plies in thickness, is obviously highly resisting to bending or twisting in directions transverse its length, while the end walls of the carrier are enabled to successfully resist twisting couples directed parallel to panel 15, due to their built in relation to said panel. This is primarily attributable to the union of the end wall extensions 50 with the panel plies, among which the end wall flaps 31, 46 are included. Needless to say, said extensions 50 assume and spread over the end walls a substantial share of the tensile load stress applied to the filled and suspended carton. They also add an attractive, closed in and finished appearance to the ends of the carrier and may be imprinted with suitable advertizing or decorative matter.

Notwithstanding the multiplication of reinforcing plies said panel, the same is quite free abrupt and substantial variations in sectional thickness such as detract from efficient gluing on machinery. This appears from an inspection of Figs. 5 and 6.

The bottle carrier structure represented in Figs. 7 through 11 of the drawings is generally similar to the form illustrated in Figs. 1 through 6. It has the same advantage of providing an effective bracing and rigidifying action for a central suspending and partition panel which is derived from certain interleaved reinforcing flaps, including inwardly foldable flaps on that panel and on its conjoined end wall sections. It also relies on a construction in which said end wall flaps are so connected with the end walls as to impart improved anti-weave characteristics to said end walls.

The embodiment of Figs. 7 through 11 differs primarily from that of Figs. 1 through 6 in that the two opposed sections of the carrier, generally designated by the reference numerals 65, 66, are connected at the bottom of the carrier by a two-panel bottom section 67, rather than along the top of the central suspending and partition panel, as in the first embodiment. Since many features of the modified construction are common to the two main component sections 65, 66 thereof, they will be designated by like reference numerals.

Bottom section 67 includes a pair of like panels 68, 69 hingedly connected to one another by a medial longitudinal crease 70 and to the side wall panels 71 of the respective sections 65, 66 by parallel creases 72. End margins of said respective wall panels are defined by transverse creases 73, 74 the respective terminal extensions 73' and 74' of said creases serving as hinges for transverse partition straps 75, 76. These partition straps, at the opposite ends thereof, are connected by the transverse fold lines or creases 77, 78 to the side wall panels 71.

A longitudinal slit 79 connecting the ends of creases 73', 77, 78 and 74' serves to set off the like suspending and partition panel sections 80 from the respective side wall sections 71. Said longitudinal slit 79 extends into the panel reinforcing flaps 81 a distance approximately half the width of the latter. The panel reinforcing flaps 81 are hingedly connected to the panel sections 80 by a foldable crease 82 which is in alignment with the crease 78.

End wall sections 84, 85 are hingedly connected by the creases 73, 74, respectively, to the respective side wall sections 71, at opposite ends thereof. These end wall sections in turn have certain reinforcing and bracing flaps hingedly connected thereto, the action of which is similar to that of the end wall flaps 31, 46 of the first embodiment. The end wall sections 84 at one end of the carrier are separated from the adjacent panel section 80 by an angled slit 86. The inner end of slit 86 joins the outer end of a longitudinal slit 87 in the blank serving to outline the partition straps 75, 76, in conjunctions with slit 79 and the hinge creases 73', 77 and 74', 78. Slits 86 angle outwardly relative to one another and terminate at the respective transverse crease lines 88, 89 which parallel the side wall defining creases 73, 74.

Of the two end wall sections 84, one thereof has a plain elongated, rectangular flap 90 foldably connected thereto by the crease 88; the other, designated 91, is similar but carries an extension 92 which is recessed at 93 for registry with one of a pair of finger holes 94 in the conjoined panel section 80 when the flap is folded inwardly on crease 88.

At the opposite end of the blank, the end wall member 85 on the section 65 of the blank carries a foldable rectangular flap 95 extending the full lateral dimension of said section. Flap 95 is separated from the panel reinforcing flap 81 by a slit 96 in alignment with the crease 89. The end wall member 85 on the other section 66 is provided with a foldable flap 97 of partial height which is separated from the panel section 81 by an L-shaped slit 98 connecting the end of crease 89 with the outer margin of the blank. The two panel flaps 81 are apertured or recessed at 99 to overlie the finger holes 94 of the panel sections 80 in an obvious manner.

In constructing the carrier from the above described blank, adhesive is applied to the panel sections 80 in the manner designated by the reference numeral 100 and to the flaps 95, 97 as indicated at 101. No adhesive is applied to either the sections 80 or flaps 95, 97 beneath the level of the respective slits 79. The flaps 90, 91 are then folded inwardly on creases 88 and adhered to the respective panel sections 80, leaving them free to hinge relative to the end wall sections 84, and panel flaps 81 are then folded inwardly about creases 82 onto the panel sections 80 and adhered thereto. Next, the end wall sections 85 (and flaps 95, 97) are folded inwardly about creases 74 and said flaps 95, 97 are caused to adhere to the exposed upper surfaces of the infolded panel flaps 81.

Figure 8:
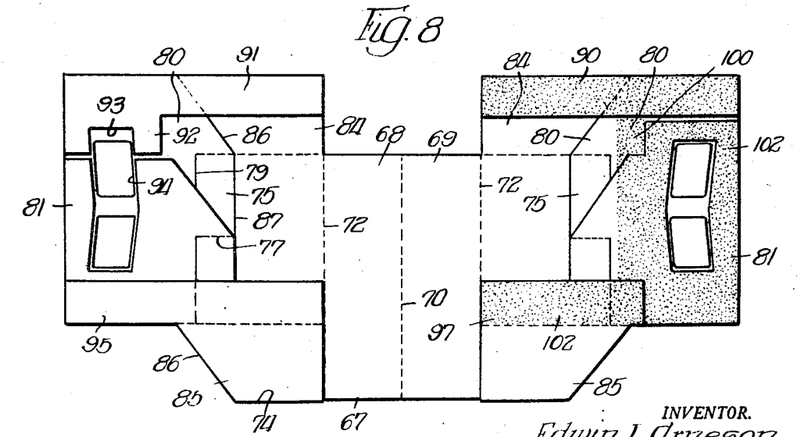
Fig. 8 is a plan view illustrating the blank of Fig. 7 following certain further folding and gluing manipulations thereof.
Figure 9:
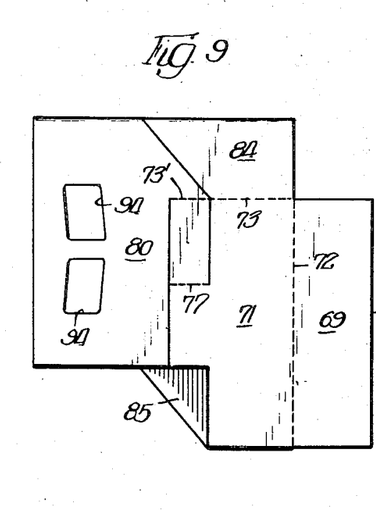
Fig. 9 is a plan view showing the carrier referred to in a flat, knocked-down condition thereof.
Figure 10:
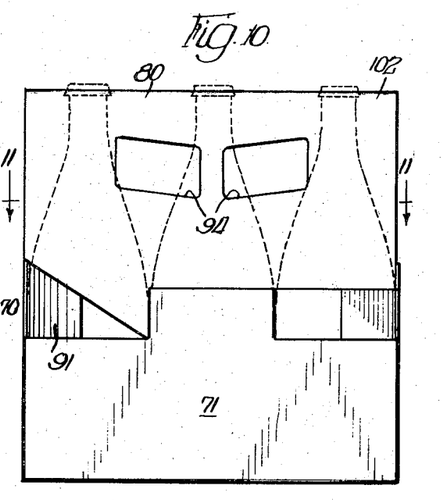
Fig. 10 is a view in side elevation illustrating the carrier of Fig. 9 in erected position and its relationship to bottles deposited therein, which are shown in broken line.
Figure 11:
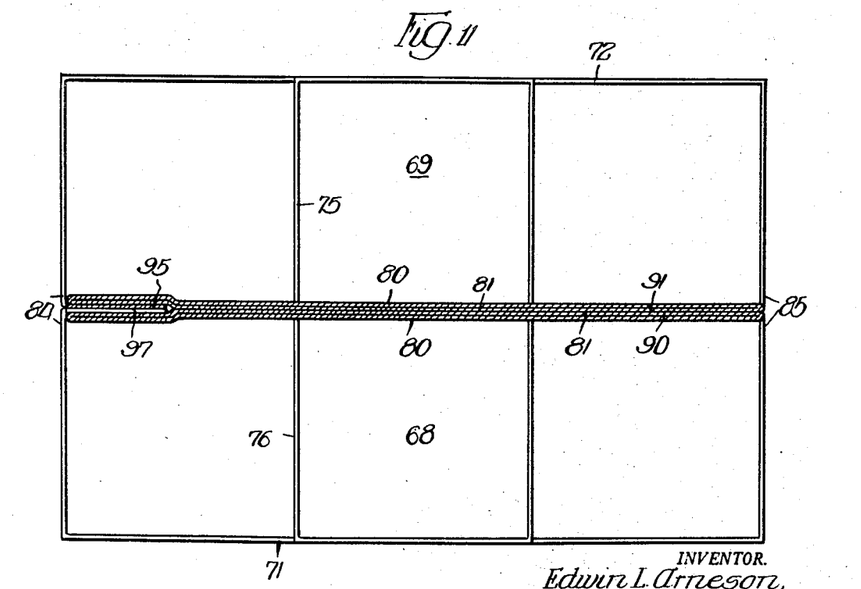
Fig. 11 is an enlarged view in horizontal section along a line generally corresponding to line 11—11 of Fig. 10.
Figure 12:
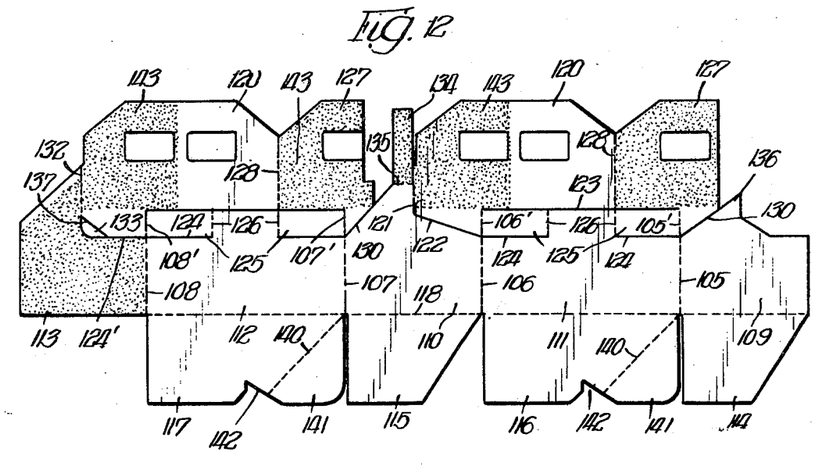
Fig. 12 is a plan view of a creased and glued blank employed in the manufacture of a bottle carrier in accordance with a still further embodiment of the invention, in which the respective sections thereof are arranged in successive end-to-end relation, this construction also being characterized by an automatic set-up bottom feature.
Figure 13:
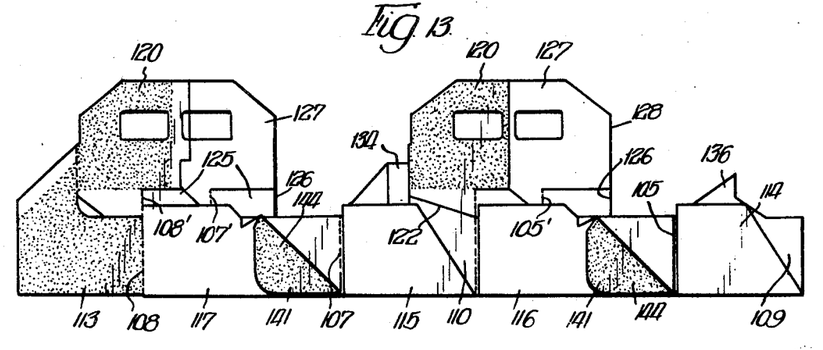
Fig. 13 is a plan view illustrating the blank of Fig. 12 following preliminary manufacturing manipulation thereof.
Figure 14:
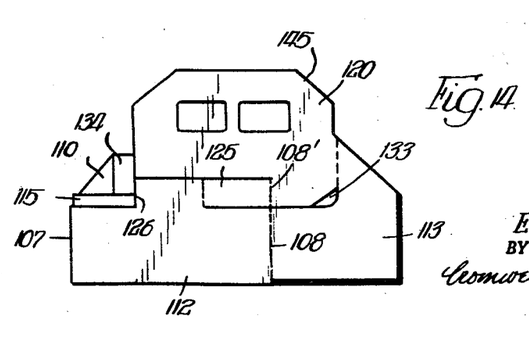
Fig. 14 is a plan view of the resultant completed carrier in its flat, knocked-down condition.

This leaves the article in the condition illustrated in Fig. 8. Adhesive 102 is next applied to the upper surface of the flaps 90, 97 and 81, in the manner indicated by stippling in Fig. 2, and the two sections 65, 66 are then folded about medial crease 70 into adherent engagement with one another. The resultant finished product is illustrated in Fig. 9 in knock down form, and is shown in Fig. 10 with bottles deposited in the cells defined by the side wall panels 71, the central panel, designated 103, which is constituted by the various plies referred to above, the end wall sections 85, and the intermediate transverse partition straps 75, 76. As illustrated in Fig. 11, the central panel 103 embodies at least four thicknesses of material adhesively secured together. The flaps 90, 91, 95 and 97 not only mechanically build up the rigidity of the panel 103, they also tie said panel functionally with the end wall sections 84, 85 to which they are integrally connected in a fashion to strongly resist wracking stresses, as discussed above in connection with the first embodiment.

The form of the invention illustrated in Figs. 12 through 18 differs from the first two embodiments in that the carrier is fabricated from a blank in which the respective end and side wall-defining sections are connected in alternate, end-to-end relation, rather than in top-to-top or bottom-to-bottom relation. The blank is elongated in shape and is subdivided by parallel creases 105, 106, 107 and 108 into two end wall sections 109, 110, two side wall sections 111, 112, and a further end reinforcing section 113. Bottom forming flaps 114, 115 and 116, 117 are hingedly connected to the respective end wall sections 109, 110 and side wall sections 111, 112 by the continuous, elongated crease 118. These flaps have certain provisions enabling the same to be adhesively secured together to constitute an automatic set-up bottom construction.

The central suspending and partition panel of the carrier includes a panel section 120 which is hingedly connected to the end wall section 110, medially of the latter, by a relatively short, vertical crease 121. Section 120 is separated from end wall section 110 by the downwardly inclined slit 122 which extends from the lower terminus of crease 121 to the vertical, wall-defining crease 106. Panel section 120 is separated from the subjacent side wall section 111 by a horizontal slit 123 coextensive in width with said section 111.

A pair of spaced horizontal slits 124 coact with slit 123 in freeing the transverse partition straps 125 from sections 111, 120, these straps being hinged at their ends to the respective sections by a pair of spaced vertical creases 126 and by further vertical creases which, since they are actually extensions of the creases 105 and 106, are therefore respectively designated 105' and 106'. A panel reinforcing flap 127 is conjoined to panel section 120 by a vertical crease 128 aligned with one of the aforesaid vertical creases 126. This flap is separated from the wall section 111 by slit 123 but is hingedly conjoined to the adjacent cross partition strap 125 by the crease 105'. It is separated from end wall section 109 by an angled slit 130.

The slitting and creasing provisions for the respective remaining side and end wall sections 112, 113, and the corresponding related elements whereby an associated panel section is provided, are practically identical to those described above in connection with sections 111 and 110. Hence like reference numerals are used to indicate corresponding parts, to the extent that this procedure is consistent with clarity, and no further detailed description will be made since it is believed that the relationships are obvious. What few distinguishing features exist will be briefly noted.

Slit 124 between the partition strap 125 and the side wall section 112 is extended horizontally at 124' across the hinge crease 108, rather than being inclined in the manner of the slit 122. However, it similarly frees the end wall section to hinge relative to central panel section 120, in this case about a vertical crease 132 between said sections. A portion of the blank is died out at 133 to facilitate this hinging.

A relatively small rectangular tab 134 is foldably conjoined to the intermediate end wall section 110, immediately adjacent its conjoined panel section 120, by means of a horizontal crease 135. This tab is adapted to be folded down and adhered to section 110, straddling the end of slit 122 and thereby combatting a tendency of the said end wall section to tear at this point. Such tendency is aggravated by the fact that the grain of the paperboard stock is usually horizontal. A triangular extension 136 on the end wall flap 109 serves a similar function with respect to the slit 124', or to the angled edge 137 which defines opening 133, when the flaps 109 and 113 are secured to one another.

The bottom forming flaps 116, 117 are angularly creased at 140 to define bendable flaps 141 and notched at 142 in a manner to provide a more or less conventional automatic bottom when the carrier is completed.

In completing the manufacture of the carrier, adhesive 143 is applied to the panel sections 120 and flaps 127, to the end wall section 113, and to the tab 134. Flaps 127 are now folded over and adhered to panel sections 120. The bottom forming flaps 114, 115, 116 and 117 are then folded upwardly onto their respective conjoined wall sections, the flaps 141 on sections 116 and 117 are reversely folded on creases 140 and adhesive 144 is applied to the thus folded flaps. This leaves the blank in the condition shown in Fig. 13.

End section 109 is now folded on hinge crease 105 and its bottom forming section 114 is adhered to the adjacent flap 144, after which the blank is folded on itself about crease 107, causing the other flap 144 to adhere to bottom forming section 115 and the two end wall sections 109, 113 to be adhesively joined as a single end wall unit, flexibly connected at its middle to a multi-ply central panel. This panel is designated 145 in Fig. 14, which shows the completed, knock down carrier.

Figure 15:
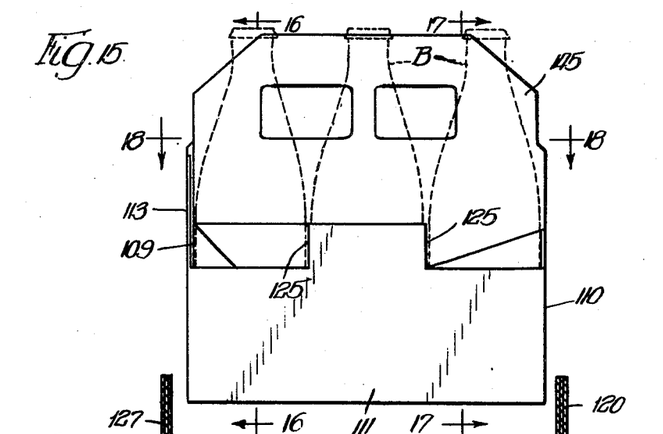
Fig. 15 is a view in side elevation illustrating a carrier of the type shown in Fig. 12 in its erected position with bottles (shown in dotted lines) loaded therein.
Figure 16:
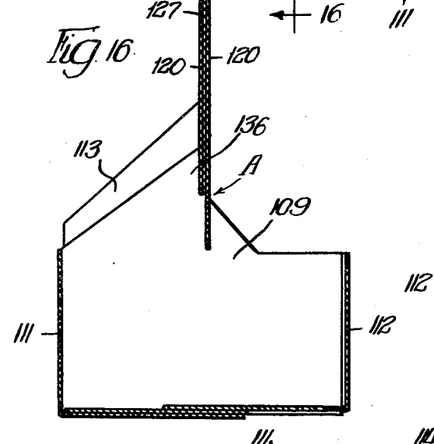
Figs. 16, 17 and 18, are, respectively, somewhat enlarged views in section along lines corresponding generally to lines 16—16, 17—17 and 18—18 of Fig. 15.
Figure 17:
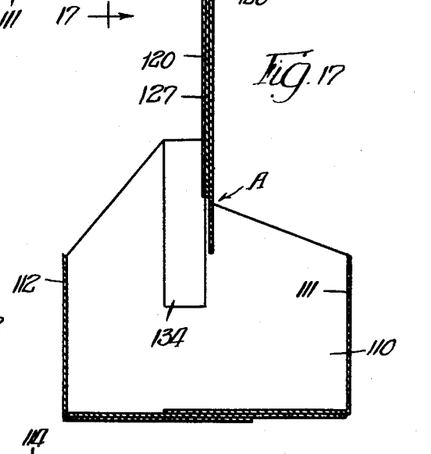
Figure 18:
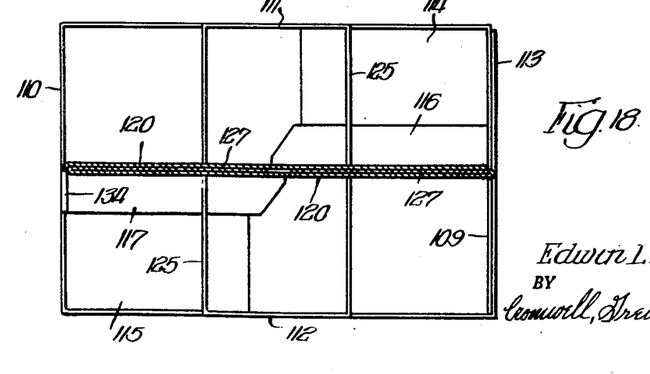

Fig. 15 illustrates the carrier in erected, bottle receiving position and Figs. 16, 17 and 18 show various structural features including the reinforced and rigidified, multi-ply character of the panel 145. The manner in which the depending tab 134 and the upstanding triangular extension 136 vertically straddle the zones A of heightened tearing stress at the juncture of said panel 145 with the respective end wall sections 109, 113 and 110 is especially well illustrated in Figs. 16 and 17.

The vertically stepped or staggered characteristic of the side walls, i. e., the greater height of the wall at the central bottle cell as compared to the height on either side thereof, is common to all three forms of the invention. The same is true of the improved carrying and anti-weave or anti-twist characteristics of the carriers, attributable to the various central panel and coacting end wall constructions described above.

I claim:

1. A paperboard article carrier comprising, in the erected condition thereof, an upright multiply panel, a pair of opposed end walls bendably connected substantially medially of the width thereof to the respective opposite ends of said panel, a pair of opposed side walls each marginally hinged at their ends to the side margins of said respective end walls and disposed in spaced parallel relation on opposite sides of said panel, said panel comprising a pair of panel sections of substantial area disposed in substantially face-to-face relation, said sections each being provided with a flap-like member bendably connected to an end margin thereof and folded inwardly into superposed relation thereto, the end wall adjacent said panel section end margin having a pair of flap-like elements hingedly connected thereto at its medial connection to said panel, said elements being folded inwardly in the same direction as said respective infolded members and disposed in superposed overlapped contact with and between the latter, and means to secure said sections, members and elements together to constitute said panel.

2. A paperboard article carrier comprising, in the erected condition thereof, an upright multiply panel, a pair of opposed end walls bendably connected substantially medially of the width thereof to the respective opposite ends of said panel, a pair of opposed side walls each marginally hinged at their ends to the side margins of said respective end walls and disposed in spaced parallel relation on opposite sides of said panel, said panel comprising a pair of panel sections of substantial area disposed in substantially face-to-face relation, said sections each being provided with a flap-like member bendably connected to an end margin thereof and folded inwardly into superposed relation thereto, one of said end walls having a pair of flap-like elements hingedly connected thereto at its medial connection to said panel, said elements being folded inwardly in the same direction as said respective infolded members and disposed in superposed overlapped contact with and between the latter, the other end wall having a pair of elements hingedly connected thereto at its medial connection to said panel, which last named elements are folded inwardly and disposed in superposed overlapped contact with and between said respective panel sections, and means to secure said sections, members and elements together to constitute said panel.

3. An article carrier in accordance with claim 2, in which said panel sections are integrally connected to one another along a bend line coinciding with the top margin of said panel and in which the termini of said bend line coincide with the opposite end margins of said panel sections, the respective elements of said first named pair of flap-like elements being separate from one another outwardly of one of said termini.

4. A paperboard article carrier comprising, in the erected condition thereof, an upright multiply panel, a pair of opposed end walls bendably connected substantially medially of the width thereof to the respective opposite ends of said panel, a pair of opposed side walls each marginally hinged at their ends to the side margins of said respective ends walls and disposed in spaced parallel relation on opposite sides of said panel, said panel comprising a pair of panel sections of substantial area disposed in substantially face-to-face relation, said sections each being provided with a flap-like member bendably connected to an end margin thereof and folded into inwardly disposed, superposed relation thereto, the end wall adjacent said panel section end margin having a pair of flap-like elements hingedly connected thereto at its medial connection to said panel, said elements being folded inwardly in the same direction as said respective infolded members and disposed in superposed overlapped contact with and between the latter, means to secure said sections, members and elements together to constitute said panel, and a pair of cross partition members disposed on each side of said panel to extend between the latter and said respective side walls in the space between said end walls, at least one partition member of each pair being integrally connected to one of said respective inwardly disposed members.

5. An article carrier in accordance with claim 4, in which said panel sections are integrally connected to one another along a bend line coinciding with the top margin of said panel and in which the termini of said bend line coincide with the opposite end margins of said panel sections.

6. A paperboard article carrier comprising, in the erected condition thereof, an upright multi-ply panel, a pair of opposed end walls bendably connected substantially medially of the width thereof to the respective opposite ends of said panel, a pair of opposed side walls each marginally hinged at their ends to the side margins of said respective end walls and disposed in spaced paralel relation on opposite sides of said panel, said panel comprising a pair of panel sections of substantial area disposed in substantially face-to-face relation, said sections each being provided with a flap-like infolded member bendably connected to an end margin thereof and folded inwardly into superposed relation thereto, the end wall adjacent said panel section end margin having a pair of flap-like elements hingedly connected thereto at its medial connection to said panel, said elements being folded inwardly in the same direction as said respective infolded members and disposed in superposed overlapped contact with and between the latter, means to secure said sections, members and elements together to constitute said panel, and a pair of cross partition members disposed on each side of said panel to extend between the latter and said respective side walls in the space between said end walls, one partition member of each pair being integrally connected to one of said respective infolded members, the other partition member of each pair being integrally connected to one of said respective panel sections.

7. An article carrier comprising, in its erected condition, an upright multi-ply suspending panel, a pair of opposed end walls bendably connected substantially medially of the width thereof to the respective opposite ends of said panel, a pair of opposed side walls marginally hinged to opposite side margins of said end walls and disposed in parallel relation on opposite sides of said panel, said panel comprising a pair of sections disposed in substantially face-to-face relation, said sections each having a flap-like reinforcing member bendably connected to adjacent corresponding end margins thereof and folded inwardly to superposed relation thereto, the end wall adjacent said last named margin having a pair of flap-like elements integrally hinged thereto at its connection to said panel which are folded inwardly in the same direction as said reinforcing members and into superposed relation between the latter, the opposite end wall having flap-like elements integrally hinged thereto which are also integrally hinged to the opposite corresponding margins of said respective panel sections, said last named elements being folded inwardly in the opposite direction from the direction of folding of said first named elements and into superposed relation between said sections, and sets of cross partitions disposed on opposite sides of said panel and inwardly of said end walls to extend between and join said panel and the respective side walls, said cross partitions being secured to said side walls, certain of said cross partitions being integrally connected at their inner extremities to said respective reinforcing members and other of said cross partitions being integrally connected at their inner extremities to said respective panel sections.

8. An article carrier in accordance with claim 2, in which said opposed side walls are connected by a bottom hingedly conjoined to lower margins thereof, and in which at least one of said pairs of end wall elements is provided with a locking formation in the lower portion thereof, said formation being engageable with said bottom adjacent an end thereof to sustain the same.

EDWIN L. ARNESON.

REFERENCES CITED

The following references are of record in the file of this patent:

UNITED STATES PATENTS

| Number | Name | Date |
| --- | --- | --- |
| 2,322,396 | Slevin | June 22, 1943 |
| 2,354,528 | Lowey | July 25, 1944 |
| 2,371,471 | Rothstein | Mar. 13, 1945 |
| 2,384,480 | Lupton | Sept. 11, 1945 |
| 2,389,318 | Lebold | Nov. 20, 1945 |
| 2,395,711 | Arnold | Feb. 26, 1946 |
| 2,418,350 | Holy | Apr. 1, 1947 |
| 2,458,281 | Lupton | Jan. 4, 1949 |
| 2,508,943 | Hall | May 23, 1950 |